UNITED STATES PATENT OFFICE.

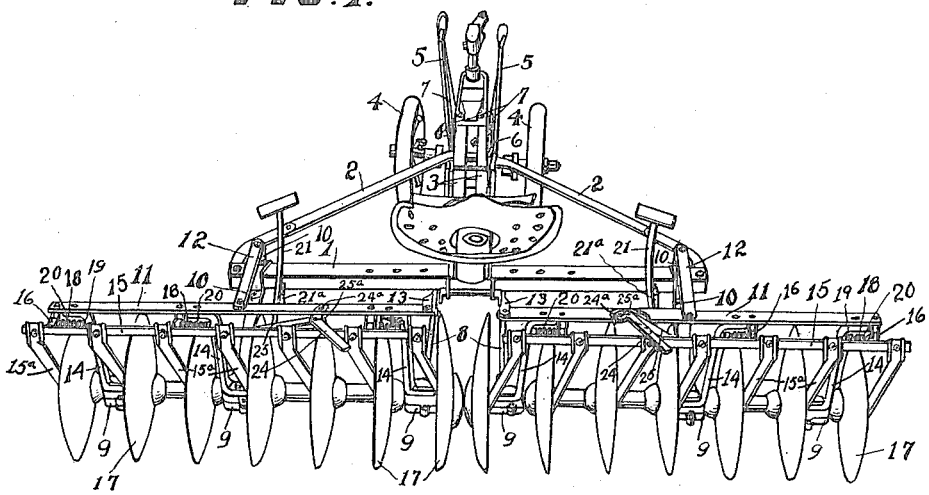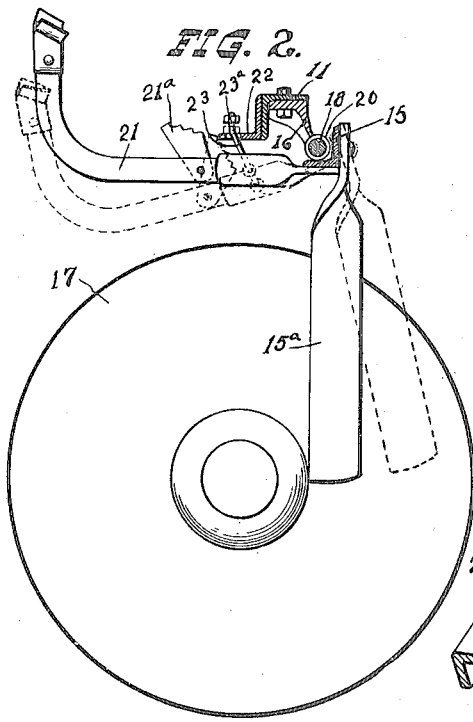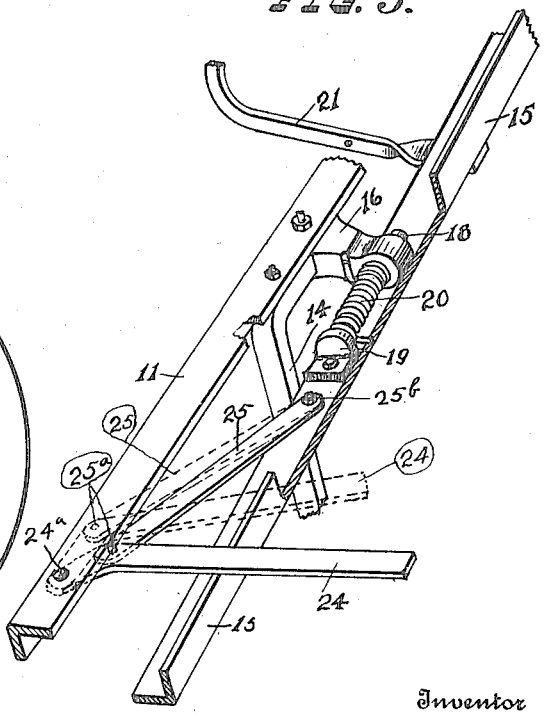

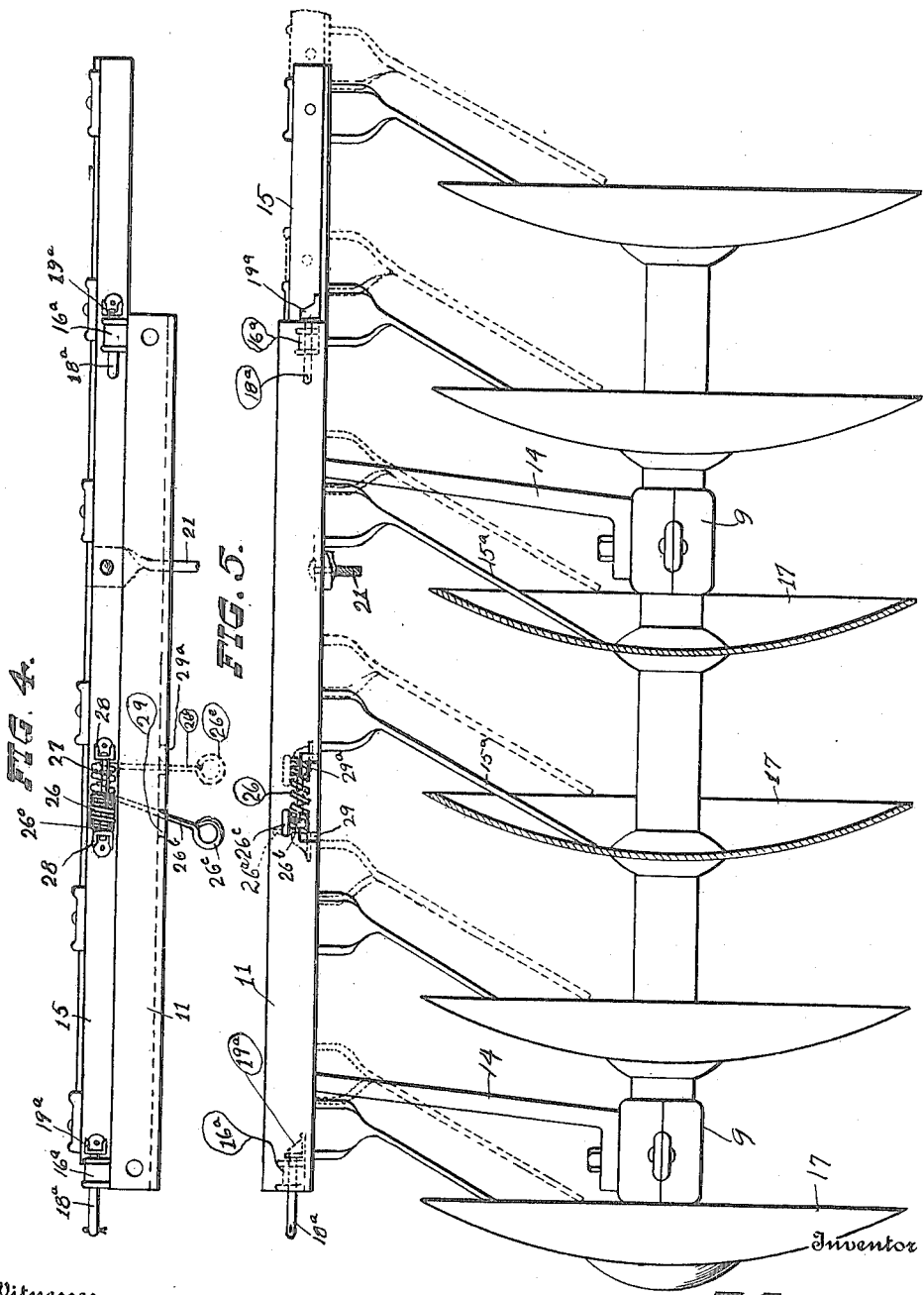

FREDERICK C. WARNE, OF MANSFIELD, OHIO, ASSIGNOR TO RODERICK LEAN MANUFACTURING COMPANY, OF MANSFIELD, OHIO, A CORPORATION OF NEW JERSEY.

DISK HARROW.

1,207,672.   Specification of Letters Patent.   Patented Dec. 5, 1916.

Application filed March 3, 1915. Serial No. 11,661.

*To all whom it may concern:*

Be it known that I, FREDERICK C. WARNE, a citizen of the United States, residing at Mansfield, in the county of Richland and State of Ohio, have invented certain new and useful Improvements in Disk Harrows, of which the following is a specification.

My invention relates to improvements in disk harrows of the pivoted gang type, the invention of the present application relating to improved scraper blade supporting, actuating, and adjusting mechanism whereby the scraper blades may be adjusted and set in any desired position toward or from the axial centers of the disks or toward and from the edges of the latter as may be desired, together with improved lever mechanism whereby the scraper blade carrying bars may be shifted longitudinally thereby enabling the operator to throw the scrapers entirely away from the disks to prevent the rubbing of the latter when the scrapers are not needed such as shown and described in my application filed June 20, 1914, Serial No. 846,225 and of which this application is a continuation of all subject-matter common to the two applications.

The primary object of the invention is the provision of generally improved scraper blade supporting actuating and adjusting mechanism for the purposes above mentioned which will be of exceedingly simple and efficient construction and which may be readily adjusted to meet the varying demands of actual service.

A further object is the provision of improved means for throwing the scrapers out of contact with the disks and for holding them in such inoperative position but ready for use when desired.

A still further object is the provision of improved means for resiliently holding and locking the scrapers in operative scraping contact or position at the concaved sides of the disks.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings forming a part of this specification, Figure 1, is a rear top view of a disk harrow equipped with improved scraper mechanism constructed in accordance with this invention, the scraper blades on the left gang being shown in operative scraping contact with the disks and the scraper blades on the right gang being thrown away from and locked out of engagement with the disks. Fig. 2, a cross sectional view of one of the front disk frames and gangs and illustrating more particularly the improved scraper mechanism and means for actuating and adjusting the blades. Fig. 3, a perspective view of a portion of one of the disk gang frames and the scraper carrying bar mounted thereon, together with the improved lever mechanism whereby the scraper blade carrying bar may be shifted longitudinally to throw the scrapers entirely away from the disks, the dotted lines illustrating the position of the parts when the bar is fully shifted and automatically locked and held in such shifted position thereby preventing the scrapers from rubbing the disks when the scrapers are not needed. Fig. 4, a top plan view of the upper bar portion of a disk gang frame equipped with a modified form of scraper blade supporting actuating and adjusting mechanism. Fig. 5, a front elevation of the same, the dotted line showing the position of the scraper bar and scrapers when shifted and locked out of contact with the concaved sides of the disks.

Similar numerals of reference designate like parts throughout all the figures of the drawings.

The improved disk harrow comprises a suitable draft frame, consisting, in the present instance, of a transverse bar 1, and a curved draft frame member 2, the latter having its forward curved portion secured to a stub-pole 3, which latter is made up of spaced angle bars secured at their rear to the transverse bar or member 1, said stub-pole being adapted to receive a fore-truck 4, as shown, or other suitable draft appliance.

The stub-pole 3, is provided with a set of pivotally mounted levers 5, and sector racks 6, said levers being provided with suitable detents 7, adapted to coöperate with the racks 6, the lower ends of said levers being connected to draft bars 8, the latter having their rear ends flexibly attached to bearing or axle boxes 9, at the inner ends of the disk gangs whereby the latter may be given the desired angle with respect to each other and the line of draft.

As a means of connecting the draft frame to the disk gangs, draft bars 10, are pivotally connected to the under outer portions of the curved frame member 2, and in front of the transverse bar 1, said draft bars extending rearwardly beneath the latter and being flexibly connected to the axle boxes 9, at or near the centers of the disk gangs, and as a means of flexibly connecting the draft frame to the upper or transverse bars 11, of the disk gang frames, brace members 12, are provided, the latter extending upwardly and rearwardly from the top of the transverse bar 1, of the draft frame, and brace members 13, also extend from the inner ends of the bars 11, of the disk gang frames to the adjustable draft bars 8, connected to the lever members 5. The disk frame bars 11, are connected to the axle boxes 9, by means of supporting bracket or brace members 14. As said draft frame and its connections with the gang frames and disk gangs form no part of the present invention the same need not be further described in detail.

The improved disk scraper and scraper supporting actuating and adjusting mechanism comprises longitudinally and circumferentially movable scraper blade carrying bars 15, mounted upon and carried by the bars 11, of the gang frames through the medium of bearing clips or brackets 16, the scraper blades 15$^a$, extending downwardly and laterally from the carrying or scraper bars 15, and along the concaved or dished sides of the disks 17, said carrying bars 15 being provided with bearing bolts 18, extending through and movable in the bearing clips or members 16, said bearing bolts 18, being secured to the bars 15, by means of attaching clips or members 19, and being surrounded by coiled springs 20, which latter are interposed between and secured to the brackets 16, and 19, whereby these springs are adapted to resist the longitudinal and circumferential movements of the scraper carrying bars 15, on the hinged bearing members 16, 18, and 19, when actuated by the mechanism hereinafter described, said springs being adapted to return the bars and scrapers to their original positions when pressure is released through the medium of the actuating mechanism.

As a means for operating or moving the scraper carrying bars 15, circumferentially, whereby the scraper blades 15$^a$, may be moved toward and from the axial centers of the disks as indicated most clearly in Fig. 2 of the drawings, foot levers 21, are attached to the bars 15, and extend forwardly and upwardly therefrom, and as a means for securing the levers 21, in any desired adjusted or depressed position said levers are provided with pivotally mounted upwardly extending notched props or brackets 21$^a$, adapted to be brought into engagement with stationary brackets 22, projecting forwardly from the bars 11, of the disk gang frames.

As a means of limiting and adjusting the downward movements of the levers 21, and consequently the outward movements of the scraper blades 15$^a$, toward the peripheries of the disks 17, eye bolt members 23, are pivotally mounted at the sides of the levers 21, and are provided with upwardly extending threaded portions extending through openings in the brackets 22, said upwardly extending threaded portions of the bolts being provided with adjustably mounted stop bolts 23$^a$, whereby the circumferential movements of the bars 15, and the tilting movements of the blades 15$^a$, may be regulated and stopped at any desired point toward the outer peripheries of the disks 17, as illustrated most clearly in Fig. 2 of the drawings.

As a means of moving the scraper blade carrying portion 15, laterally or longitudinally against the resistance of the coiled springs 20, surrounding the bearing bolts 18, hand levers 24, are pivotally connected to the disk frame bars 11, said levers being connected to link members 25, extending outwardly and connected to the scraper carrying bars 15, (see Fig. 3) so that by moving the hand levers 24, outwardly or to the dotted line position in Fig. 3 and the full line position shown at the right in Fig. 1, the bars 15, will be moved longitudinally or laterally against the resistance of the springs 20, thereby carrying the blades 15$^a$, away from the disks 17, the connection between the link members 25, and hand levers 24, being such that when the latter are thrown to their extreme outer portions said bars and blades will be automatically held and toggle locked in such position in an obvious manner until released thus keeping the scrapers entirely away from the disks to prevent their rubbing the latter when the scrapers are not needed. It will be seen that the pivot bolt or connection 25$^a$, connecting the inner end of the link member 25, to the lever 24, is such relative to the pivot bolt or connection 24$^a$, of the hand lever to the bar 11, and the pivot bolt or connection 25$^b$, at the outer end of the link member that when the lever 24, is pushed over to the position shown at the right in Fig. 1 and in dotted lines in Fig. 3 a self-locking and holding position will be assumed for holding the scrapers 15$^a$, out of operative contact with the disks or cutters 17.

It will be seen that the connecting bolt or element 25$^b$, is on substantially the same plane with the pivot bolt 18, so that there is but a slight movement at this point when the scraper carrying bar 15, is circumferentially moved through the medium of the lever 21, and it will be understood that there is sufficient looseness in the mounting of the parts 24ª, 25ª, and 25ᵇ, to permit of such movement.

Referring now to the modified form of scraper bar supporting, actuating and adjusting mechanism shown in Figs. 4 and 5 of the drawings, it will be seen that the scraper blade carrying bar 15, is pivotally and slidably attached to the transverse bar 11, of the disk gang frame through the medium of a pair of bearing clips 16ª, receiving and containing a pair of bearing bolts or pintles 18ª, the latter being secured to and carried by attaching clips or brackets 19ª, secured to the scraper bar 15.

As a means for resisting the circumferential movements of the bar 15, when actuated by the depressing movement of the foot lever 21, as well as resiliently holding the scraper blades 15ª, in contact with the disks 17, a coiled spring 26, is coiled about a supporting bolt 27, said bolt being mounted in attaching clips 28, secured to the top portion of the bar 15, said spring 26, having one end 26ª, bearing against the rear side of the angle bar member 15, and terminating at its other end in an extended portion 26ᵇ, forming an operating lever or shank terminating in a handle loop 26ᶜ.

As a means of shifting the bar 11, longitudinally to and from its respective scraping and non-scraping positions as indicated by full and dotted lines in Fig. 5 of the drawings, as well as a means of locking such scraper bar and scrapers in such respective shifted positions, angular shaped slots or recesses 29, and 29ª, are provided in the lower front side of the bar 11, of the gang frame so that when the extension or handle portion 26ᵇ, is shifted and held in the slot or recess 29, against the resistance or expansive action of the spring 26, the blades 15ª, are resiliently held in contact with the concaved sides of the disks and when the foot lever 21, is depressed the bar 15, will be moved circumferentially on the pintles 18ª, against the circumferential resistance of the spring 26, through the engaged end 26ª, thereof in moving the scrapers toward and from the peripheries of the disks in an obvious manner. It will thus be seen that the spring 26, not only resists the circumferential movements of the bar 15, when the latter is moved through the depressing movement of the foot lever 21, in either of the two shifted positions of the extending or handle portion 26ᵇ, in the slots 29, and 29ª, but when the handle portion 26ᵇ, is shifted and held in the angular shaped recess 29, said spring by being compressed and through its expansive force serves to resiliently hold the blades 15ª, in contact with the concaved surfaces of the disks thereby providing an exceedingly simple and effective device for the purposes above mentioned.

It will be seen that the lever or handle 26ᵇ, corresponds largely in function to the lever 24, shown in Figs. 1 and 3 of the drawings except that it is attached directly to the scraper bar or rock shaft 15, thereby dispensing with the connecting link 25, and furthermore, it extends forwardly in front of the bar 11, of the gang frame instead of rearwardly as in the case of the lever 24.

From the foregoing description, taken in connection with the accompanying drawings, the operation and advantage of my invention will be readily understood.

Having thus described some of the embodiments of my invention, what I claim and desire to secure to secure by Letters Patent, is,—

1. In a disk harrow, the combination with a disk frame and gang, and a spring resisted longitudinally and circumferentially movable scraper carrying bar mounted thereon; of means for circumferentially moving said scraper carrying bar, and a combined tension spring and shifting lever for longitudinally moving adjusting and locking said scraper carrying bar.

2. In a disk harrow, the combination with a disk frame and gang, and a spring resisted longitudinally and circumferentially movable scraper carrying bar carried by said frame; of means for circumferentially moving and means for circumferentially adjusting said scraper carrying bar, and a tension spring and shifting lever for longitudinally moving and adjusting said scraper carrying bar independently of said circumferentially moving and adjusting means.

3. In a disk harrow, disk gangs and frames therefor, scraper bars circumferentially and longitudinally movable on said disk gang frames and provided with depending scraper blades at the concaved sides of the disks of said disk gangs, combined tension springs and levers carried by said scraper bars, said levers being longitudinally movable whereby said scraper blades may be thrown into and out of contact with said disks, means on said disk frames for securing said levers in their respective shifted positions, and means for circumferentially moving said scraper bars against the resistance of said combined tension springs and levers whereby said scraper blades may be moved toward and from the peripheries of said disks.

4. In a disk harrow, the combination of a disk frame and disk gang, said disk frame being provided with bearing clips, scrapers for the disks of said disk gang, a scraper carrying bar provided with pintles movable in said bearing clips, yielding means tending to hold said scrapers in contact with said disks, means for locking said scrapers in adjusted position relative to the peripheries of said disks, means for moving said scrapers toward and from the peripheries of said disks, and a lever by a stroke of which in one direction said scrapers are adapted to be moved laterally and locked out of contact with said disks against the action of said yielding means and by a stroke of which in the other direction the scrapers are adapted to be returned to operative position and held by said yielding means but free to be moved circumferentially.

5. In a disk harrow, disk gangs and frames therefor, scraper bars circumferentially and longitudinally movable on said frames and provided with depending scraper blades at the concaved sides of the disks of said disk gangs, means for circumferentially moving and adjusting said scraper bars whereby said scraper blades may be moved and adjusted along said disks relative to the peripheries thereof, and combined spring and lever mechanism for moving and locking said scraper bars longitudinally whereby to move said scraper blades laterally into and out of contact with said disks and for resiliently resisting the circumferential movements of said scraper bars through said circumferentially moving and adjusting means.

6. In a harrow, the combination of a gang of revoluble cutters, a gang frame provided with bearing clips, a scraper carrying bar provided with bearing clips carrying laterally extending pivot bolts movably and removably mounted in said bearing clips of said gang frame, scrapers on said scraper carrying bar and movable with the latter and said pivot bolts toward and from said revoluble cutters, yielding means tending to hold said scrapers in contact with said cutters, and a lever pivotally mounted relative to said scrapers and movable laterally therewith and adapted to be swung laterally into a locking engagement with said gang frame for holding said scrapers out of operative contact with said cutters.

7. In a harrow, the combination of a frame provided with rearwardly extending bearing clips and a gang of revoluble cutters, a rock-shaft provided with laterally extending pivot bearing bolts laterally movable in said bearing clips with the like movements of said rock-shaft, scrapers for said revoluble cutters adapted to be moved laterally with said rock-shaft and pivot bearing bolts, yielding means acting upon said rock-shaft tending to hold said scrapers in contact with said cutters, and a lever movable laterally with said rock-shaft adapted by an operative stroke laterally to move said scrapers out of operative contact with said cutters and adapted to be moved into a locking position for holding said scrapers out of operative contact with said cutters.

8. In a disk harrow, a disk gang provided with space bearing clips, a scraper carrying bar provided with similarly spaced bearing clips carrying laterally extending bolts longitudinally and circumferentially movable in said first mentioned bearing clips, resilient means for resisting the longitudinal and circumferential movement of said scraper carrying bar on said bearing bolts, and means for longitudinally and circumferentially moving and adjusting said scraper carrying bar against the resistance of said resilient means.

9. In a harrow, a disk gang frame provided with a plurality of spaced bearing clips, a scraper carrying bar provided with a plurality of similarly spaced bearing clips carrying bearing bolts extending through and laterally and circumferentially movable in said first mentioned bearing clips through the like movements of said scraper carrying bar, resilient means for resisting the movements of said bar and bearing bolts, and means for longitudinally and circumferentially moving said bar and bearing bolts against the resistance of said resilient means.

In testimony whereof I have affixed my signature in presence of two witnesses.

FREDERICK C. WARNE.

Witnesses:
D. A. MEUR,
N. P. HENRY, Jr.

Copies of this patent may be obtained for five cents each, by addressing the "Commissioner of Patents, Washington, D. C."